United States Patent [19]

Huang et al.

[11] Patent Number: 5,035,904

[45] Date of Patent: Jul. 30, 1991

[54] STARCH-BASED PRODUCTS FOR MICROWAVE COOKING OR HEATING

[75] Inventors: Victor T. Huang, Moundsview, Minn.; R. Carl Hoseney, Manhattan, Kans.; Ernst Graf, New Brighton, Minn.; Katy Ghiasi, St. Anthony, Minn.; Linda C. Miller, St. Louis Park, Minn.; Jean L. Weber, Minneapolis, Minn.; Karin C. Gaertner, Blaine, Minn.; Kristin L. Matson, Coon Rapids, Minn.; Antoinette M. Hunstiger, Edina, Minn.; Deborah K. Rogers, Manhattan, Kans.; Israel A. Saguy, Edina, Minn.

[73] Assignee: The Pillsbury Company, Minneapolis, Minn.

[21] Appl. No.: 571,041

[22] Filed: Jul. 30, 1990

Related U.S. Application Data

[63] Continuation of Ser. No. 213,075, Jun. 29, 1988, abandoned.

[51] Int. Cl.$^5$ ............................................. A21D 8/00
[52] U.S. Cl. ..................................... 426/243; 426/549
[58] Field of Search ............... 426/241, 243, 549, 496, 426/94; 219/10.55 M

[56] References Cited

U.S. PATENT DOCUMENTS

| | | | |
|---|---|---|---|
| 3,220,850 | 11/1965 | Kirk | 426/243 |
| 3,427,171 | 2/1969 | Jeppson | 426/241 |
| 3,556,798 | 1/1971 | Tucker | 426/551 |
| 3,556,817 | 1/1971 | Jeppson | 426/241 |
| 3,630,755 | 7/1970 | Schiffmann | 426/241 |
| 3,694,228 | 9/1972 | Hochhauser et al. | 426/241 |
| 3,818,108 | 6/1974 | Morrison | 426/549 |
| 3,840,668 | 10/1974 | Joiner et al. | 426/549 |
| 3,876,805 | 4/1975 | Craig et al. | 426/656 |
| 4,230,924 | 10/1980 | Brastad et al. | 426/234 |
| 4,299,848 | 11/1981 | Stefanis et al. | 426/549 |
| 4,318,931 | 3/1982 | Schiffmann et al. | 426/243 |
| 4,367,241 | 1/1983 | Chableix | 426/242 |
| 4,463,020 | 7/1984 | Ottenberg | 426/243 |
| 4,529,607 | 7/1985 | Lenchin et al. | 426/243 |
| 4,560,559 | 12/1985 | Ottenberg | 426/243 |
| 4,690,829 | 9/1987 | Usui | 426/549 |
| 4,957,750 | 9/1990 | Cochran et al. | 426/19 |

FOREIGN PATENT DOCUMENTS

| | | |
|---|---|---|
| 1442042 | 10/1968 | Fed. Rep. of Germany . |
| 2246214 | 3/1974 | Fed. Rep. of Germany . |
| 380769 | 12/1907 | France . |

OTHER PUBLICATIONS

International Search Report 04/09/90 for International Application No. PCT/US89/02897.
Chemical Abstracts, vol. 81, 1974, p. 366, 76689z.
Journal of Food Sciences, vol. 46, No. 5, Sep./Oct. 1981; D. J. Martin et al., "Baking High-Ratio White Layer Cakes with Micro-Wave Energy", pp. 1507-1513.
Higo et al., "Hardening of Food Texture Induced by Microwave Irradiation (Part 8); Effect of Starch-Gel Formation on Bread-Hardening", Aoyama Kaseigaku Zasshi, vol. 34, No. 2, pp. 83-88, 1983.
Anonymous, "Lot of Work and Research went into Zappetites Debut", World Food & Drink Report, Oct. 8, 1987.

(List continued on next page.)

*Primary Examiner*—George Yeung
*Attorney, Agent, or Firm*—Arnold, White & Durkee

[57] ABSTRACT

The present invention provides treatment means for reducing microwave-induced toughness and/or firmness in microwave cooked or heated bread-like products. The invention permits the maintenance of product identity and the reduction of toughness and/or firmness regardless of the toughness or firmness that the product would exhibit without the treatment means. The treatment means includes added agents as well as processing steps for the reduction of toughness and/or firmness.

34 Claims, 7 Drawing Sheets

OTHER PUBLICATIONS

Ashby, "The Mechanical Properties of Cellular Solids", Metallurgical Transactions, vol. 14A, Sep. 1983, pp. 1755–1769.

Finney, "An Optimized, Straight-Dough, Bread-Making Method After 44 Years", Cereal Chemistry, vol. 61, No. 1, 1984, pp. 20–27.

Kimbrell, "Microwave Ovens Provide New Opportunities for Bakery Companies", Bakery, Nov. 1987, p. 19.

Kramer et al., "A Device for Measuring Food Quality", The Canner, Feb. 3, 1951, pp. 34–36.

Rosenberg et al., "Microwave Thawing, Drying, and Baking in the Food Industry", Food Technology, Jun. 1987, pp. 85–91.

Moore et al., "Microwave Pizza Bows in Test Market; New Protein System Makes Crispy Crust", Food Prod. Rev. 13(10):20(1979).

Schofield et al., "The Effect of Heat on Wheat Gluten and the Involvement of Sulphydryl-Disulphide Interchange Reactions", Journal of Cereal Science 1 (1983), pp. 241–253.

| ITEM | FLOUR TYPE | FAT* LEVEL (%) | WATER* (%) | FAT INCORP. METHOD | DEGREE OF DEVELOPMENT | CHARACTERISTICS |
|---|---|---|---|---|---|---|
| FRENCH ITALIAN VIENNA BREADS | HARD | 0-1.5 | 35-40 | FORMULA | HIGH | CHEWY CRUMB |
| WHITE PAN BREADS | HARD | 1.5-5.0 | 30-40 | FORMULA | HIGH | TENDER, SHORT CRUMB |
| SWEET ROLLS | HARD AND SOFT BLENDS | 10-15 | 20-30 | FORMULA | HIGH | VERY SOFT CRUMB |
| PASTRIES | HARD AND SOFT BLENDS | 30-45 | 10-25 | LAMINATION | HIGH | FLAKY, MANY LAYERS |
| PIE CRUST | SOFT | 20-40 | 16-20 | CUT INTO FORMULA | VERY LOW | FLAKY, TENDER |
| BISCUITS | HARD AND SOFT BLENDS | 2.5-20 | 20-35 | CUT INTO FORMULA OR LAMINATION | LOW-MED. | TENDER, FLAKY LAYERS |

*dough weight basis

STARCH-BASED PRODUCTS FOR MICROWAVE COOKING OR HEATING

This is a continuation of copending application Ser. No. 07/213,075 filed on June 29, 1988, now abandoned.

BACKGROUND OF THE INVENTION

Microwaves are at the lower energy end of the electromagnetic radiation spectrum which includes gamma rays, X-rays, ultraviolet, visible light, near infrared, infrared radiation, microwaves and radio waves. Microwave processing offers advantages over conventional oven heating for some food products because it produces rapid product heating without excessively high surface temperatures. However, this type of heating is "opposite to" conventional cooking of foods with respect to moisture and heat transfer.

Convenience is a major factor in the popularity of microwave ovens. Consumer surveys have shown that microwave market penetration has reached 70% of the households with projections for growth extending through the 1990's. Along with the increase in penetration of the microwave oven into the home has come a demand for microwaveable food products.

There has been a large expansion in the number of microwave foods available on the market. However, typically this has amounted to the inclusion of microwave directions and not food reformulations for textural attributes. Particularly in the area of bread-like foods, little, if any, improvement in textural attributes has been made in commercially available products. It has thus not been desirable to reheat or cook such products in a microwave oven. Both precooked and uncooked products may exhibit excessive toughening and firming when exposed to microwave radiation.

The present invention relates to solutions for overcoming or reducing at least two problems relating to crumb texture attendant with heating precooked or uncooked bread-like products in a microwave oven. Precooked and uncooked bread-like products may exhibit both toughness and firmness as a result of microwave heating.

A major technical difficulty for microwaving breadlike products is the development of the aforediscussed unacceptable texture. The outer crust layer may become so tough that it is difficult to tear such a product. The inner crumb may become very difficult to chew. Also, the textural quality can deteriorate much faster than that of a conventional oven baked product during the course of cooling. Overcooking in a microwave oven may exacerbate the problem while a reduction in overall cooking or reheating may reduce toughness and firmness.

It has been reported that Oscar Mayer & Co. developed a microwaveable sandwich by using a specific type of starch, and a precise ratio of starch to fat to flour in the dough (Anonymous, 1987). One method of dealing with texture problems is to use a specially designed protein system in the dough (Moore, 1979) which has been reported not to become tough during microwave treatment. Another approach, as disclosed in U.S. Pat. No. 4,463,020, requires the use of long grain rice flour in the dough. An approach described in U.S. Pat. No. 4,560,559 requires the addition of starch granules having an average size of less than approximately 20 microns. It has been reported that fat in combination with other substances reduced toughness in microwaveable dough-based items (Kimbrell, 1987). The tenderizing effect of fat has been attributed to the "shortening effect".

Toughness can be defined and assessed in sensory terms as a leathery or rubbery eating texture. For example, a bagel is tough while a croissant is tender. Firmness can be defined and assessed in sensory terms as the force required to bite through the sample without tearing or pulling. A "stale" dough-based product can be characterized as firm while fresh bread immediately after conventional cooking would be considered nonfirm.

Whether or not a product is tough or firm or, more accurately, is objectionably tough or firm, depends on the product type and the consumer. For example, the expectation for bread is that it should be soft and not tough. If bread had a bagel texture it would be objectionable because of the toughness. However, a bagel, even though it is tough, is not objectionable since the expectation is for a product that has a tough texture. Thus, the type of product and the consumer will set the standard for what level of toughness or firmness is objectionable or desirable.

One of the complicating factors in dealing with bread-like systems is that minor changes in the formula or process can change the product identity from one product to another product. For example, further development of a biscuit dough will produce a baked product which is more of a bread, and frying of a yeast leavened product will produce a doughnut while baking of the same yeast leavened dough will produce a bread-like product. Thus, a careful balance must be made in the processing and the formula to solve product problems and not change the product identity.

Figure 1:
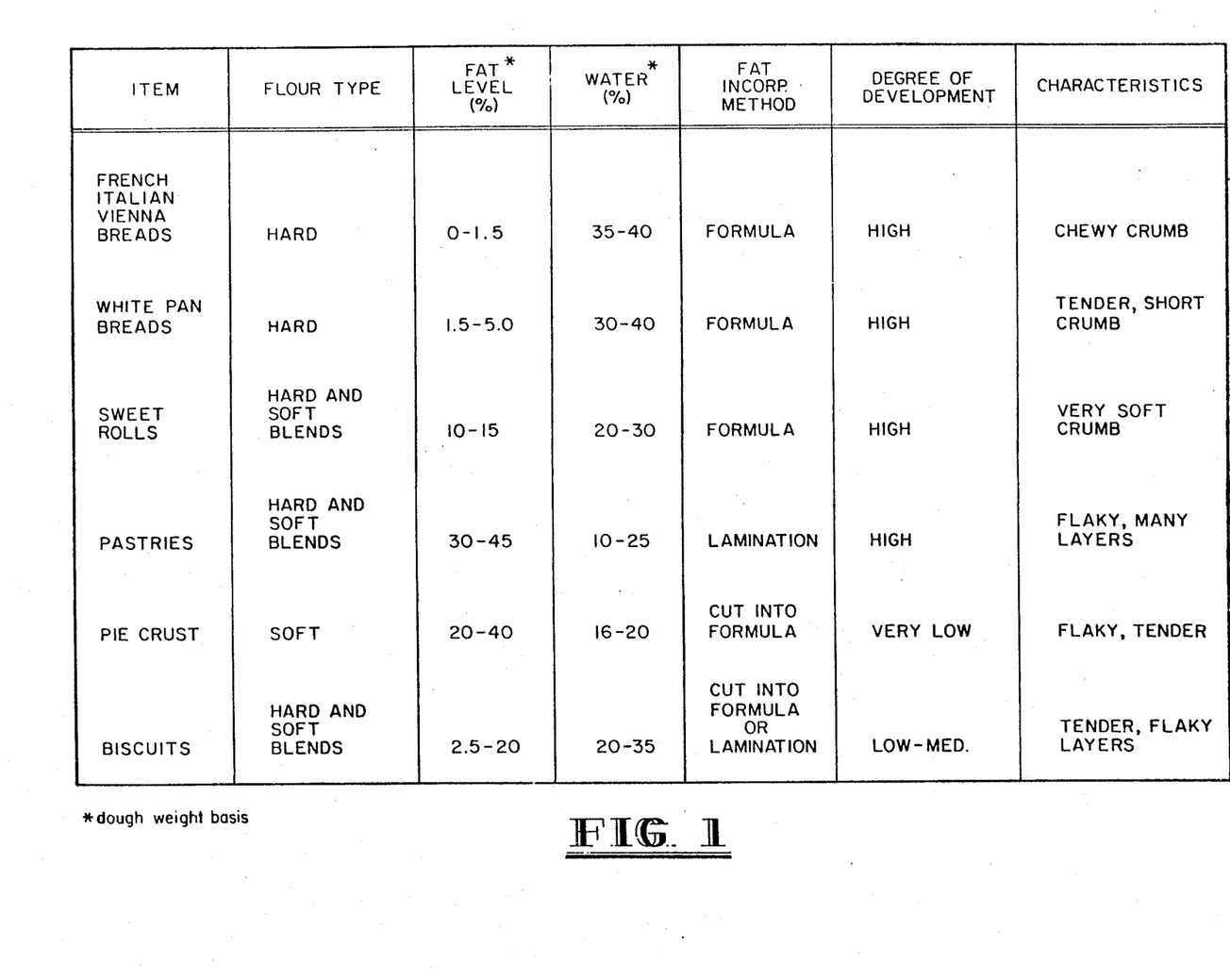
FIG. 1 Graphically illustrates different product identities and the corresponding product characteristics.

Three criteria are the major determining factors for product identity. Those criteria are: the flour type and its protein content; the amount of fat; and the degree of dough development. See FIG. 1 for examples.

Additional factors may affect product identity. Some of these factors include, for example: type of fat; type of leavener; dough formation method; method of fat inclusion; method of cooking the product e.g., steaming, frying, baking, etc.; method of assembling the dough product, for example, laminating versus nonlaminating, etc. These and many related factors and principles are discussed in Hoseney (1986).

Further, the same cereal grain can provide major differences in the product. For example, changing from a soft wheat to a hard wheat can significantly change the product identity. Dough-based products may be prepared from one cereal grain flour or mixtures of several cereal grain flours. For dough-based products the cereal flour should be capable of forming a viscoelastic continuous protein matrix upon hydration.

It has surprisingly been found that the present invention easily permits maintenance of product identity while being able to freely manipulate toughness and firmness. Toughness and firmness can be reduced from any point along scales ranging from non-tough and non-firm products to very firm and tough products. More specifically, the present invention involves methods to reduce toughness and firmness to the desired degree relative to a similar formula product when heated in a microwave oven. The present invention provides the latitude to manipulate toughness and firmness regardless of the original toughness and firmness for a similar non-invention product.

The present invention involves means and methods to reduce the degree of the above-mentioned toughening and/or firming of bread-like products upon their heating, e.g., reheating or cooking by microwave irradiation.

Additional processing criteria are set forth in a patent applications entitled Method of Microwave Heating of Starch-Based Products by K. H. Anderson et al. and Dough-Based Products for Microwaving by J. L. Weber et al., filed contemporaneously herewith, the entire disclosures of which are incorporated herein by reference.

The present invention also relates to a product composition with gluten of reduced molecular weight to provide a product with improved microwaveability. The present invention includes a product formulation with low pH and/or low ionic strength to provide improved microwaveability. The present invention also describes a dough-based composition containing a surfactant to provide improved microwaveability.

Embodiments of the invention can provide good quality microwaveable bread-like products including unleavened and leavened products. Leavened products include those leavened by microorganisms such as yeast, chemicals, and steam, etc. as is known in the art. By use of the present invention, therefore, a good quality microwaveable product including reconstitutable dry mix, fresh or raw dough, frozen dough or precooked bakery products may be prepared in the microwave oven.

The present invention can be practiced with starch containing or starch-based products. These products can take the form of dough products and non-dough products. Dough products will exhibit.. toughness and often firmness as a textural problem. Dough-based can be defined as a product which has a continuous matrix of gluten. Preferably such products have at least 4% gluten by weight in the dry flour. More preferably a dough-based product will have 6% or more gluten by weight of dry flour. Non-dough products, hereafter referred to as batter-based products, are characterized in that they have minimal or no gluten-matrix in the plasticized mixture of flour and plasticizers. Generally batter-based products have low gluten i.e., less than about 8% gluten by weight of dry flour, and can have no gluten. Batter-based products may exhibit firmness as a result of microwave heating and not toughness because of the lack or low degree of the continuous gluten matrix.

As hereinafter discussed, toughening is predominantly a protein related phenomenon, more specifically a gluten related phenomenon. Also as hereinafter discussed, firming is a predominantly starch related phenomenon. For the practice of the present invention, any cereal grain based product from which a dough or batter can be made, can be utilized. Firming in any of these products may be improved by practice of this invention. Products containing on a dry flour basis, at least 4% gluten may utilize the invention to reduce toughening. Combinations of cereal grains can also be utilized to form a dough or batter. Cereal grains include wheat, corn, rye, barley, oats, sorghum, triticale, etc.

As used herein, bread-like product is not limited to breads as defined in the standards of identity under the Food, Drug and Cosmetic Act. Bread-like products include such foods as breads, biscuits, cornbread, quickbreads, pastries, sweet rolls, pita bread, pie crust, pizza crust, pasta, dumplings, etc. whether or not the product is made from a dough-based product or batter-based product as defined herein.

As used herein, the term "dough-based product" includes products that are partially cooked or cooked and were in a dough form just prior to cooking by any means. The term "dough-based product" also includes products that are dough prior to cooking or reheating in a microwave oven. Dough may be defined as a viscoelastic substance which is developed or partially developed.

As used herein, the term "batter based product" includes products that are partially cooked or cooked and were in batter form just prior to cooking. The term batter based product also includes products that are batter prior to cooking or reheating in a microwave oven. Batter may be a liquid or can be a pastry material much like "brownie dough" or "cookie dough".

A product intermediate is either a dough based or batter based product in whatever form, for example, in a cooked, partially cooked or uncooked (raw) state just prior to exposure to microwave radiation.

The products when cooked typically have a composition by weight of about 20–85% flour, about 15 to 45% total water, and about 0 to 50% fat. The products in their uncooked condition typically have a composition by weight of about 20 to 80% flour, about 18 to 55% total water, and about 0–45% fat.

Dry mix as used herein means a mixture of ingredients normally used to make a dough or batter as is known in the industry. Such mixes can come in any package size and are generally sold through retail, food service or commercial outlets. The dry mix has added to it liquid ingredients such as water and fats, which are plasticizers, and other optional ingredients such as eggs, etc.

An acceptable texture is more like the texture of a conventionally cooked equivalent or similar product as is known in the industry. Conventional cooking includes convection, conduction, non-microwave irradiation like radiant heat cooking, electrical resistance heating i.e., the food product or bread-like product is used to conduct current, etc. The invention product texture is better than the texture of an equivalent product without using the invention. For purposes of this disclosure, a similar or equivalent product is a product that has substantially the same formula except for the ingredient(s) added or processing for microwave texture improvement as hereinafter described. Such a product is also analogously processed i.e., it is processed in the same way and precooked and or heated the same. However, because some of the agents added can change the amount of work required for developing or mixing, the amount of work input during mixing or development can be changed such that the degree of mixing or development is the same. This is also true for an overdeveloped dough i.e. The formula and other processing conditions are the same except for the degree of development. It is preferred that the improvement in product with the invention relative to a similar product without the invention being distinguishable to a consumer and is at least about 5, preferably at least about 10 or more preferably at least about 15 points on a 0–60 organoleptic relative sensory testing scale (with 60 representing high toughness or firmness) using a trained panel. Such a testing procedure is known in the art. It is preferred that the improvement in the product with the invention relative to a similar product without the invention is at least about 10%, preferably at least about 20%, and more preferably at least about 30% improvement on the relative sensory testing scale as described herein.

The products of the present invention comprise flour and sufficient plasticizer to form a dough or batter. The dough or batter can include aqueous and nonaqueous plasticizers. Nonaqueous plasticizers include fats. However, in some products, added fat is not necessary, for example, with French bread. The water content used herein, unless otherwise indicated is added water. It is to be understood that flour contains approximately 14% water by weight of flour.

In accordance with an aspect of the present invention, a good quality cooked or uncooked microwaveable product can be produced, such products can be distributed, and/or stored under conditions such as frozen, refrigerated (pressurized or unpressurized), and shelf-stable systems.

An advantage of the present invention is that the treatment means, by way of process and/or additives for the dough-based or batter-based products is effective in reducing microwave-induced toughness and firmness a distinguishable amount.

Another advantage of the present invention is that the treatment means for reducing toughness and/or firmness does not require special processing equipment to effectuate.

Another advantage of the present invention is that the treatment means is effective for reducing the toughness or firmness from any level of toughness or firmness for an equivalent product that does not utilize the treatment means.

Other objects will become apparent from a review of the specification.

The following abbreviations are used in this specification:

| | |
|---|---|
| AU | Anson Unit. |
| B. licheniformis | Bacillus licheniformis |
| B. subtilis | Bacillus subtilis |
| cm | centimeter |
| DATA | diacetyl tartaric acid ester |
| HLB | hydrophile/lipophile balance |
| Kg | kilogram |
| KIO₃ | potassium iodate |
| kPa | kilo Pascal |
| min | minute |
| RH | relative humidity |
| SALP | sodium aluminum phosphate |
| SAPP | sodium acid pyrophosphate |
| SODA | baking soda; sodium bicarbonate |
| SDS | sodium dodecyl sulfate |
| SSL | sodium stearyl lactylate |

BRIEF DESCRIPTION OF THE DRAWINGS

FIG. 5 A and B show the effect of proteolytic enzymes on product quality.

SUMMARY OF THE INVENTION

The present invention provides means and methods for controlling toughening and firming in microwaved dough-based and batter-based products. As discussed above, these attributes of the product can, when not properly controlled, cause negative consumer reactions to the products.

It appears that the application of microwave energy to dough-based and batter-based products provides additional or different structures in the resulting cooked or reheated product as compared with conventionally cooked or heated products. In conventionally cooked products, structure building elements such as protein and starch interact to provide the desired structure. Microwave heating accentuates formation of or enhances this structure, which may cause textural problems. Theories are presented herein concerning potential bases of microwave-induced toughening and firming. These theories are included to more fully envision but not limit uses of the present invention but may eventually prove to be incomplete or inaccurate.

Toughening of dough-based and batter-based products subjected to microwaving is thought to be predominantly a protein related phenomenon. It has been found that such toughening can be significantly reduced by the use of protein interaction inhibitors.

Protein interactions or toughness may be inhibited by treatment means, for example, by processing such as overdevelopment or the inclusion of agents such as preferential binding materials such as surfactants, by reduction in the molecular weight of the protein, by increasing electrostatic repulsion and by using hydrogen bond breakers.

Firming induced by microwaving may be reduced by limiting the starch-starch interaction. This can be done by treatment means, for example, by processing such as overdevelopment or by the inclusion of agents that limit the amount of starch swelling. Exemplary starch swelling inhibitors include surfactants or shortenings. Substances characteristically inhibiting protein-protein interactions have been found to often decrease microwave-induced firming.

DETAILED DESCRIPTION OF THE INVENTION

As used herein, all percents are by weight and all temperatures are at 21° C. unless otherwise designated.

Measuring of a value for toughness with mechanical measuring devices has been difficult. However, toughness can be easily measured by trained taste panels of people and can be reasonably quantified on arbitrary toughness scales. Such techniques are well known in the food industry and are generally referred to as organoleptic testing.

A panel of trained people was used to evaluate products. An initial training session was used to familiarize the panelists with the range of products that would be tested. Reference standards were presented in this session to train the panelists to recognize the differences between the product attributes that were to be measured.

The trained panel marked two reference products used as standards on a 0-60 point line scale with 0 being the low end and 60 the high end. Two standards (low end and high end of the scale) were tasted prior to each evaluation session, and were marked on the score sheets. A separate score sheet as described above was used for the test samples. No more than five test samples were marked on a given score sheet. The presentation of references at each session was used so that responses which occurred at different times could be standardized. The mean score is reported. Evaluations by panelists which were significantly different from the remainder of the panel were eliminated from consideration. This testing procedure is more fully disclosed in Moskowitz (1983), the entire disclosure of which is incorporated herein by reference.

Two major textural attributes were tested: firmness and toughness. Firmness was assessed by the force required to bite through the sample without tearing or pulling. Toughness was assessed as the rate of breakdown at which the sample came apart during mastication.

Testing by a mechanical apparatus is desirable, but because of the dynamics of eating the food products, there are variables that an apparatus does not have the ability to measure. However, the Kramer Shear Press method has proved fairly successful in measuring firmness on a relative basis for each sample set.

A Kramer Shear press (Kramer et al., 1951) equipped with a loading cell of 500 kg was attached to an Instron Universal Testing Instrument (Model 1011; Canton, Mass.). Data were collected using computerized data collection on an IBM PC/XT connected directly to the Instron (Instron, 1987). Twenty points per second were collected. Four to six replicates were measured on for each product. All measurements herein were at room temperature (21° C.) unless otherwise indicated.

Crumb samples (4.0×4.0×1.5 cm) were cut using a template. A crumb sample is a product sample taken from the interior section of the product with no crust. The crosshead speed was 12.7 cm/minute. The stress (kPa) was continuously recorded up to 200% strain. The instrumental results were correlated with assessments of a trained panel. To establish correlations between the sensory scores and the instrumental measurements of maximum stress (kPa) measured with the Kramer Shear Press, twenty different dough products conventionally baked and/or microwaved, were assessed.

The correlation coefficient derived from correlating the sensory score versus the maximum stress yielded this equation: firmness score=9.4+0.03×maximum stress. Based on the correlation obtained (r=0.81), the maximum stress was used to express firmness. The relatively high correlation coefficient indicates that the two methods may be utilized interchangeably.

Most grains, including cereal grains, oil seeds, etc., are predominantly comprised of protein, starch and fat, with starch being the major component of all cereal grains. Tests were conducted to investigate causes of microwave-induced toughening. These tests included solvent testing of dough-based products that were precooked and then reheated in a microwave oven. There are three protein interactions that might be involved in the toughening process. Those interactions are covalent bonding, hydrogen bonding, and hydrophobic interaction. In the case of covalent bonding, solubility tests using sodium dodecyl sulfate (SDS) and mercaptoethanol were conducted as well as electrophoresis testing as known in the industry. The solubility tests showed that very little protein was soluble using SDS alone. However, in the presence of SDS plus mercaptoethanol, substantially all protein was solubilized. This indicated that no significant solubility-inhibiting covalent bonding was occurring except for the disulfide bonding that is characteristic of gluten proteins. This was consistent with the findings reported by Schofield et al. (1983).

It was additionally found that, insofar as protein solubility shows, there was no net increase in the crosslinking of polymers (proteins) by disulfide bonds as a result of the microwave reheating (Table I).

TABLE 1

PROTEIN SOLUBILITY AS A FUNCTION OF MERCAPTOETHANOL CONCENTRATION

| Mercaptoethanol (%) | Percent Soluble Protein (± standard deviation) | |
| --- | --- | --- |
| | Bread Crumb | Microwave Reheated |
| 0 | 28.9 ± 0.3 | 28.8 ± 1.0 |
| 0.25 | 42.1 ± 3.3 | 39.2 ± 3.8 |
| 0.50 | 53.4 ± 6.0 | 52.4 ± 10.3 |
| 0.75 | 85.6 ± 16.5 | 80.4 ± 21.1 |
| 1.00 | 98.2 ± 0.7 | 100.2 ± 3.0 |
| 1.50 | 100.9 ± 1.0 | 102.3 ± 2.0 |
| 2.00 | 100.2 ± 0.3 | 100.8 ± 1.7 |

Electrophoresis tests were conducted to determine whether there were shifts in the molecular weight distribution of the gluten proteins. The proteins extracted from microwave reheated bread crumb had the same molecular weight distribution as proteins extracted from conventionally baked, non-reheated bread crumb.

In conclusion, neither the number nor the location of disulfide (covalent) bonds significantly changed as a function of microwave reheating.

To investigate a possible relationship of hydrophobic interactions and toughening or firming, tests with several surfactants were conducted. If surfactants reduced toughening, then it would be sound to conclude that preferential bonding between the surfactant and the protein inhibited protein-protein interactions. The surfactant test indicated a reduction in toughening. It appeared that hydrophobic interactions are a significant cause of toughening in precooked dough-based products.

In regard to raw dough products which are cooked in the microwave oven, additional tests were conducted to determine the cause of toughening. Because raw dough product has a higher moisture content than the cooked product, there is higher mobility of protein molecules. This higher mobility may lead to even more toughening. As in the case of precooked products, the possible causes of toughening in raw dough products cooked in a microwave oven were predominantly protein-protein interactions. Thus, it was surprisingly found that toughening of precooked and uncooked products was predominantly a protein related phenomenon.

Figure 10:
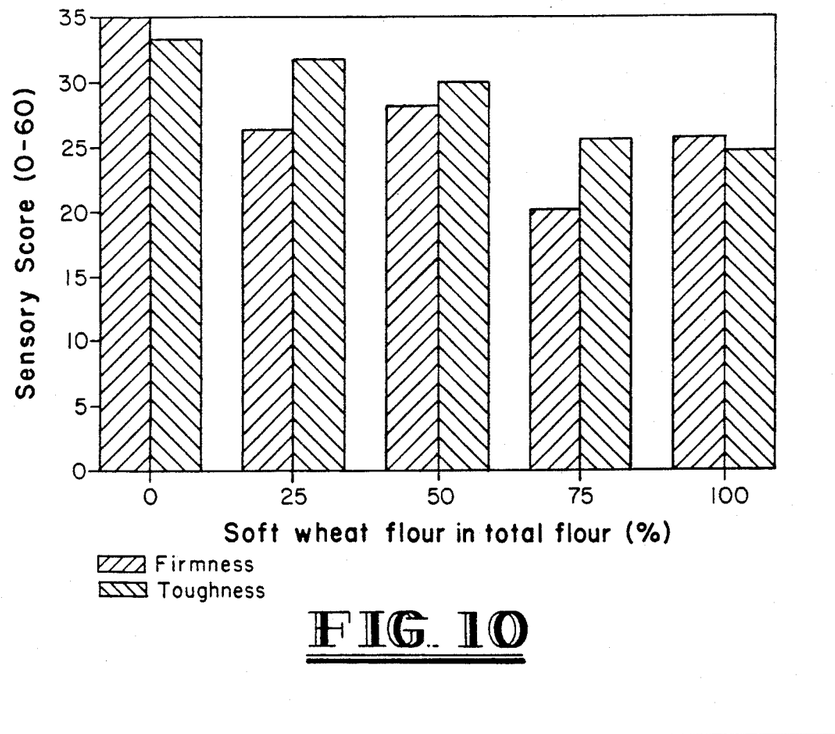
FIG. 10 shows the effect of wheat flour type on product quality.

Tests were conducted in which the ratio of soft wheat flour and hard wheat flour were used. As shown in FIG. 10, the products with higher percentages of soft wheat flour were less tough and firm. Thus, it was surprisingly found that microwave-induced toughening and firming could be reduced by the selection of protein quality, such as soft wheat, or by inhibiting or reducing the protein-protein interactions of proteins having poor microwave-ability (eg. hard wheat gluten).

Inhibitors of protein-protein interactions include compounds or agents that preferentially react or bind with proteins to minimize these interactions. Sufficient protein interaction inhibitor may be added to dough prior to microwave cooking or reheating to reduce toughening.

Figure 8A:
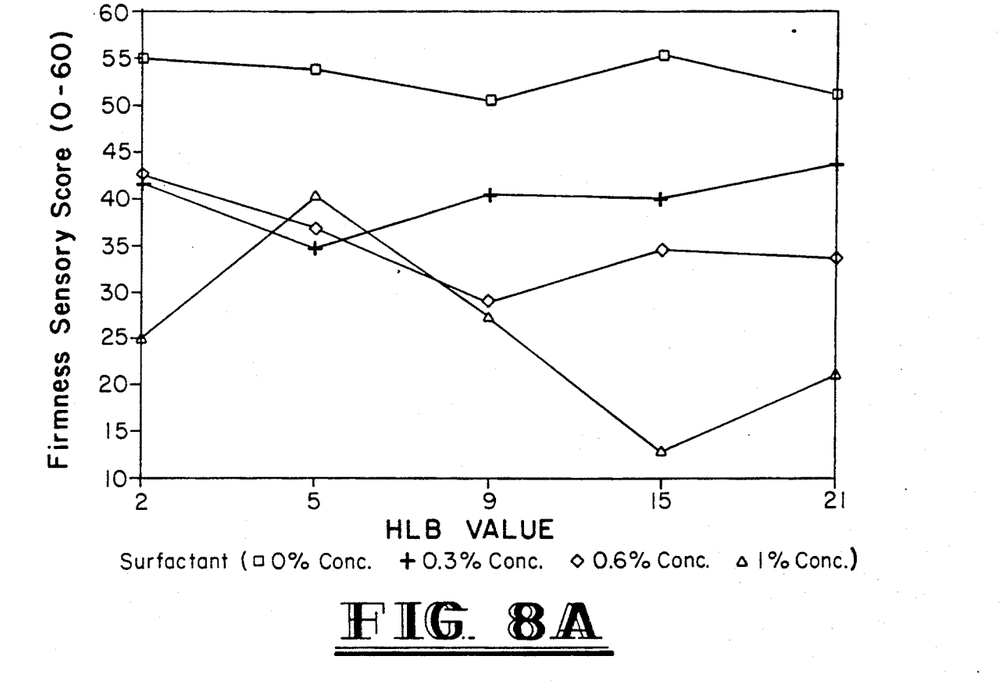
FIG. 8 shows the effect of surfactants on product quality.
Figure 8B:
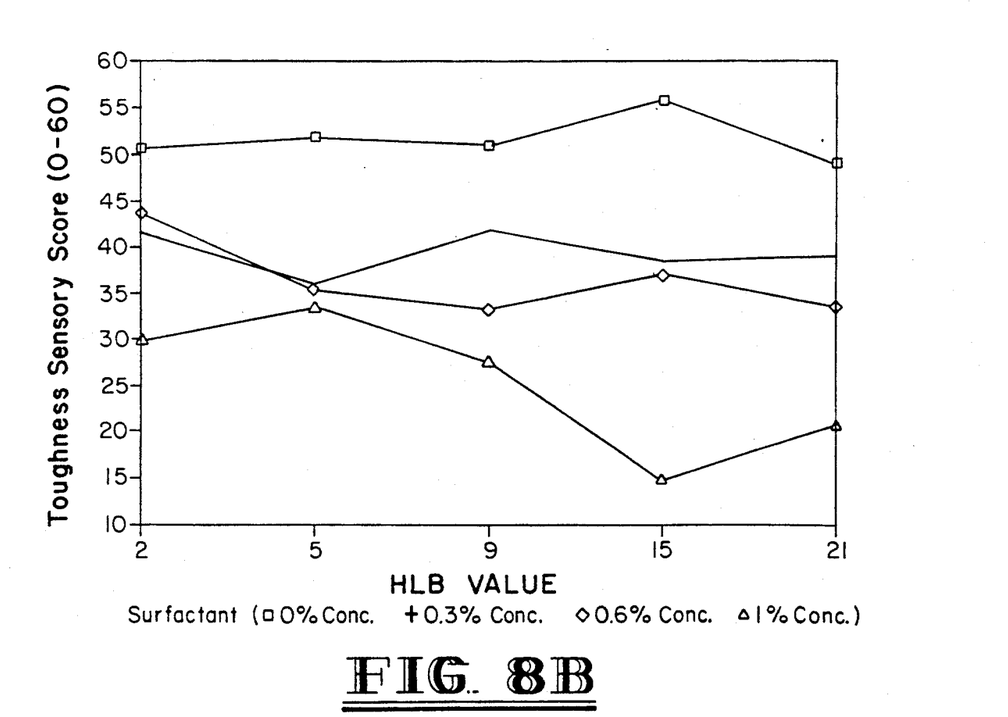

According to the present invention, surfactants (emulsifiers) may be used to reduce protein-protein interaction and subsequent toughening induced by microwave irradiation. Surfactants have been used in conventionally cooked dough products for the purpose of dough conditioning (strengthening dough) and to prevent staling. Usable or potentially usable surfactants include stearyl-2-lactylates; sorbitan mono-fatty acid esters; monoglycerides: 1-propylene glycol mono-fatty acid esters; sucrose fatty acid esters; diacetyl tartaric acid ester of monogycerides and ethoxylated monoglycerides; polysorbate 60; polysorbate 80, etc. FIG. 8 shows that the effect of surfactants is independent of HLB values. HLB values are represented by the following emulsifiers respectively:

| HLB | Liquid | Solid |
| --- | --- | --- |
| 2 | | Distilled monoglycerides |
| 5.2 | | 80% Mono- & Diglycerides + 20% Polysorbate 80 |
| 9 | | DATA |
| 14.9 | Polysorbate 60 | |
| 21 | | SSL |

Figure 2:
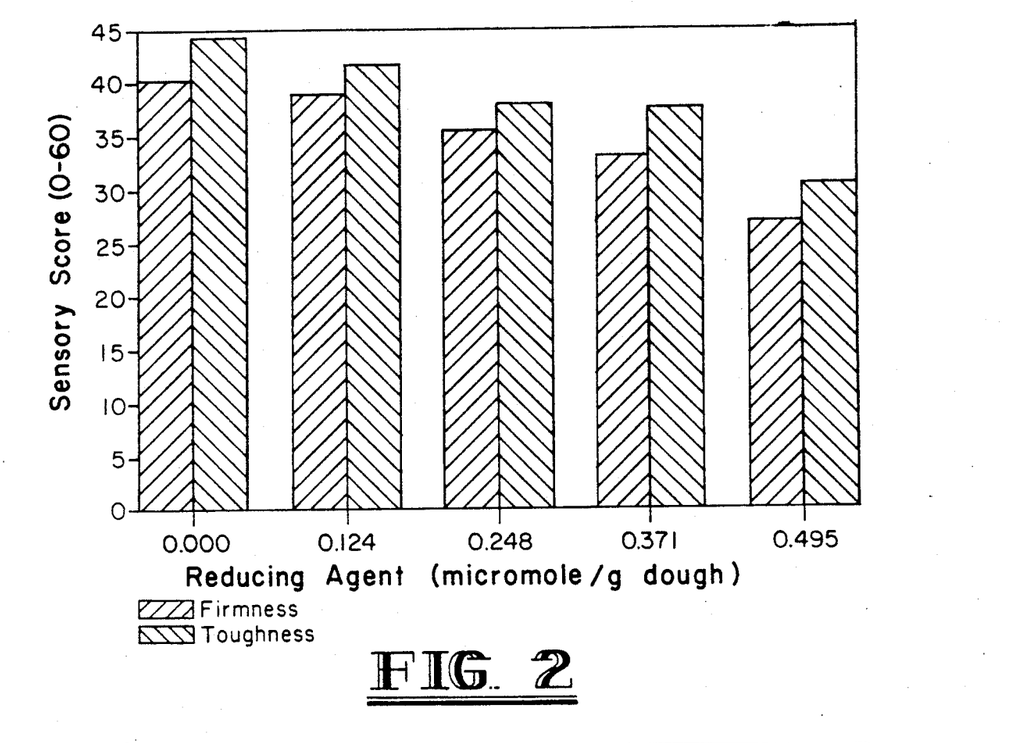
FIG. 2 shows the effect of a reducing agent on product quality.

Another class of interaction inhibitors acts to reduce the molecular weight of the protein. This can be done by the cleavage of gluten disulfide bonds with mixing agents (disulfide reductants), e.g., cysteine (see FIG. 2), glutathione from dry yeast, bisulfites, dithiothreitol, and mercaptoethanol.

Gluten disulfide bonds can be broken by mixing and their reformation can be prevented by the addition of alpha, beta-unsaturated carbonyl compounds such as sorbate, maleate, N-ethylmaleimide, cinnamate, ferulate, fumarate, cinnamaldehyde, crotonaldehyde, maleic anhydride and acrolein.

Figure 3:
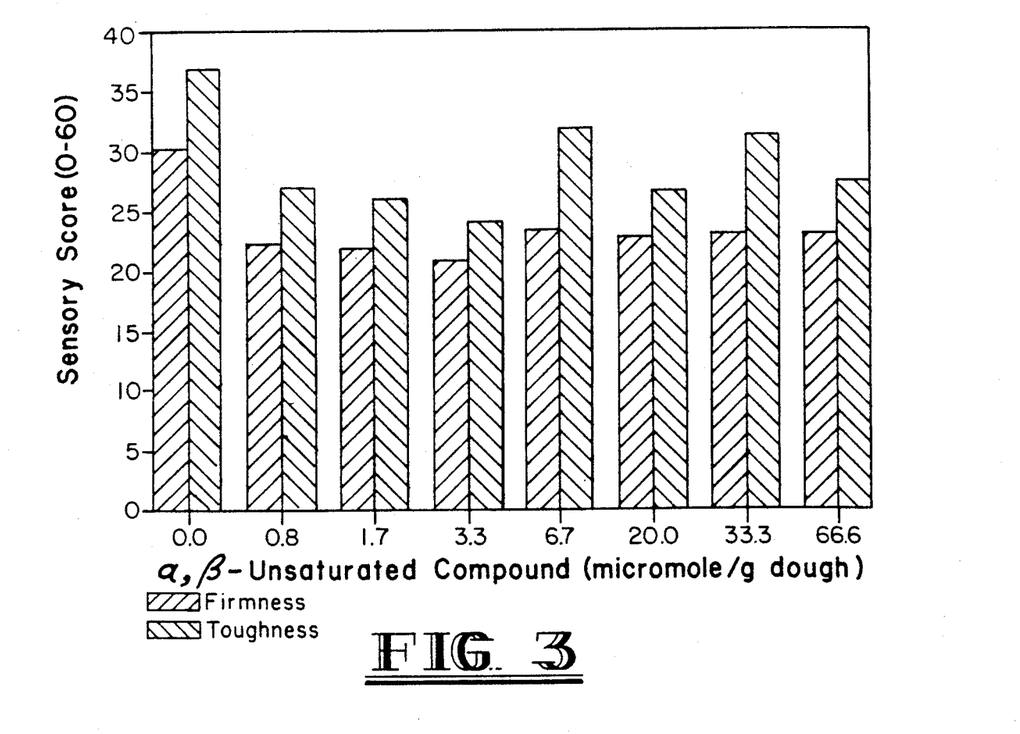
FIG. 3 shows the effect of an alpha, beta-unsaturated carbonyl compound on product quality.

FIG. 3 shows the effect of potassium sorbate on the firmness and toughness of biscuits.

Figure 4:
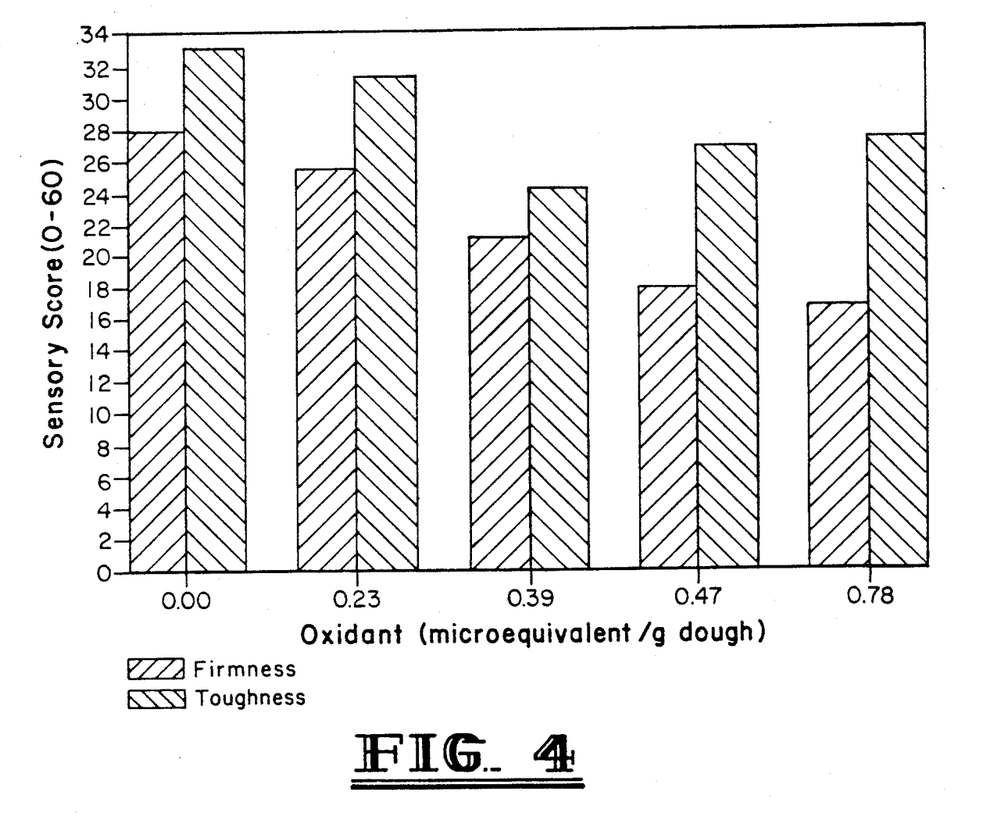
FIG. 4 shows the effect of a fast acting oxidant on product quality.

Fast acting oxidants such as potassium iodate, calcium iodate or diazocarbonamide represent a class of compounds that may produce alpha, beta-unsaturated carbonyl compounds, for example, during high shear mixing. FIG. 4 shows the effect of potassium iodate ($KIO_3$) on product quality. Any oxidizing agent with reduction potential higher than that of ortho or para-quinones is expected to be functional.

Figure 5A:
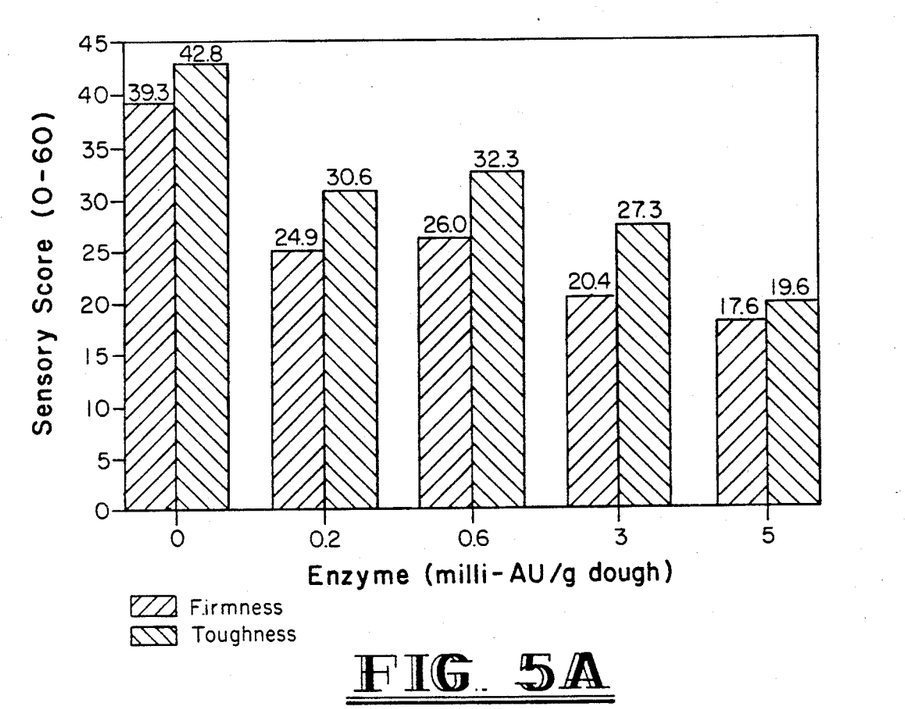
FIG. 5A shows B. subtilis protease
Figure 5B:
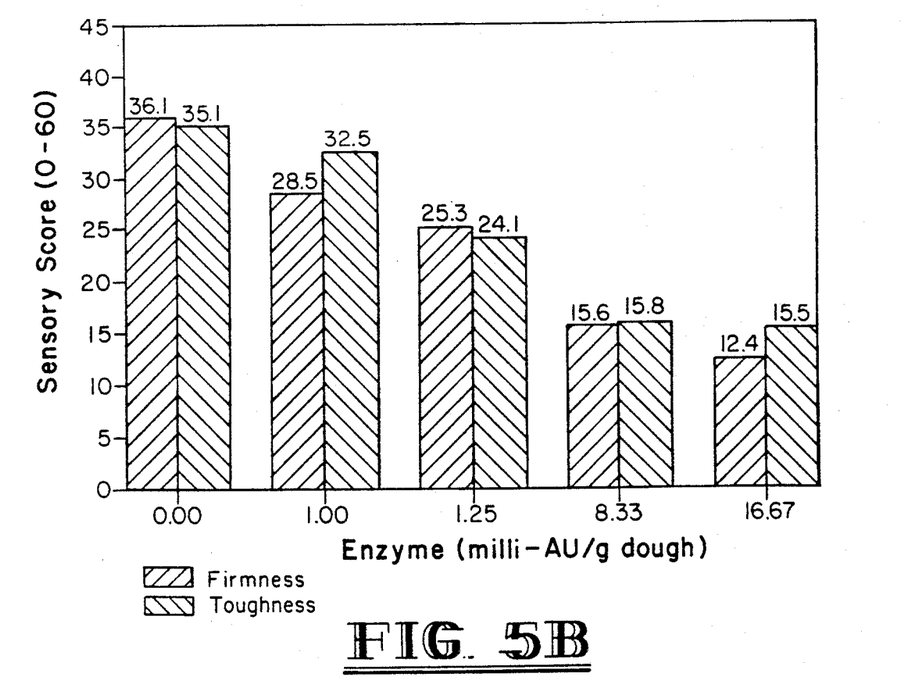
FIG. 5B shows licheniformis protease.

The molecular weight of proteins can also be reduced by the enzymatic hydrolysis of peptide bonds. The bacterial proteases tested were effective at decreasing microwave-induced toughness and firmness. Other plant, animal and microbial proteases are also expected to be effective. One Anson Unit (AU) is the amount of enzyme which, under standard conditions, liberates an amount of TCA soluble product which gives the same color with phenol reagent as one milliequivalent of tyrosine. The standard conditions are: substrate—denatured hemoglobin, temperature—25° C., pH—7.5, reaction time—10 minutes. FIG. 5 shows that the level of enzymes was directly related to product quality. Hence, a preferred group of ingredients are yeast extracts and autolysates which contain both protease and glutathione as a reducing agent.

Figure 7:
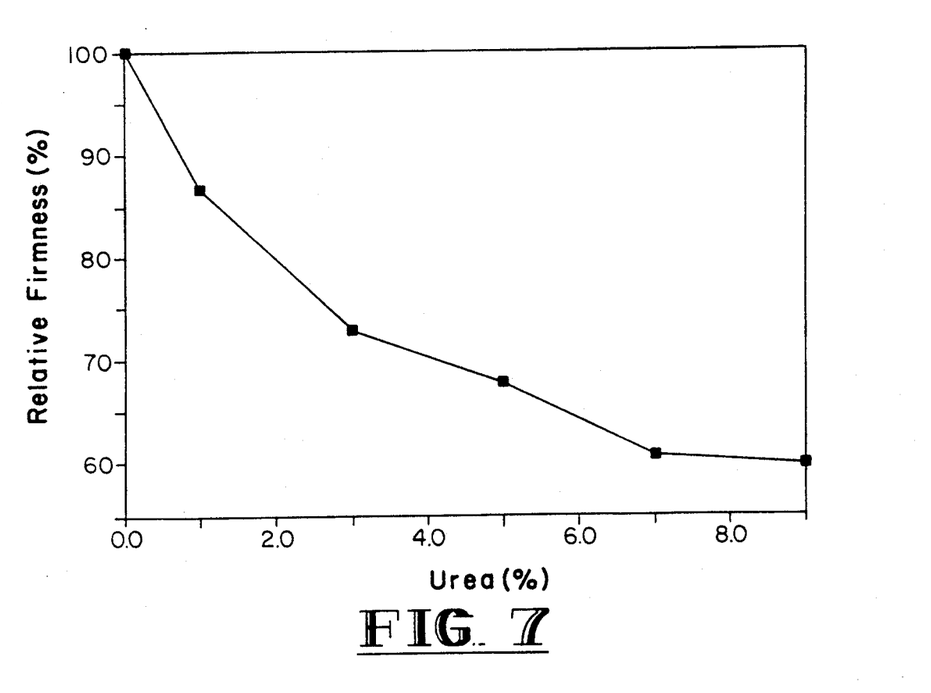
FIG. 7 shows the effect of urea on relative firmness as measured by a Kramer shear press.

Hydrogen bonds in gluten can also be broken to reduce protein interactions. These relatively weak bonds can be broken with chemicals such as urea, guanidine, dimethylsulfoxide and N,N-dimethylformamide. Although all the above hydrogen bond-breaking compounds are not food approved, at least some were tested to see if disruption of hydrogen bonds reduced firmness. As shown in FIG. 7, increasing concentrations of urea decreases firmness. Since decreases in firmness and toughness attributes are highly correlated, the firmness results shown probably also represent the reduction in toughness.

Increasing electrostatic repulsion between proteins such as gluten molecules is another way of inhibiting gluten interaction and subsequent toughening. There are two approaches to this, depending upon the optimal pH of the product system. First, for a product with relatively high pH, such as chemically leavened products, a deamidase can be used to hydrolyze asparagine and glutamine to aspartic and glutamic acid residues. Approximately 35%–40% of the 20 amino acids present in gluten are asparagine and glutamine. Their enzymatic hydrolysis to aspartic acid and glutamic acid, respectively, decreases the isoelectric point of gluten molecules and also decreases their hydrophobicity which reduces hydrophobic interaction. Also, the pH of the product will be higher than the isoelectric point of gluten and in the presence of high electrolyte concentration from leavening agents and added salt, the protein-protein ionic attraction will be minimized.

Figure 6:
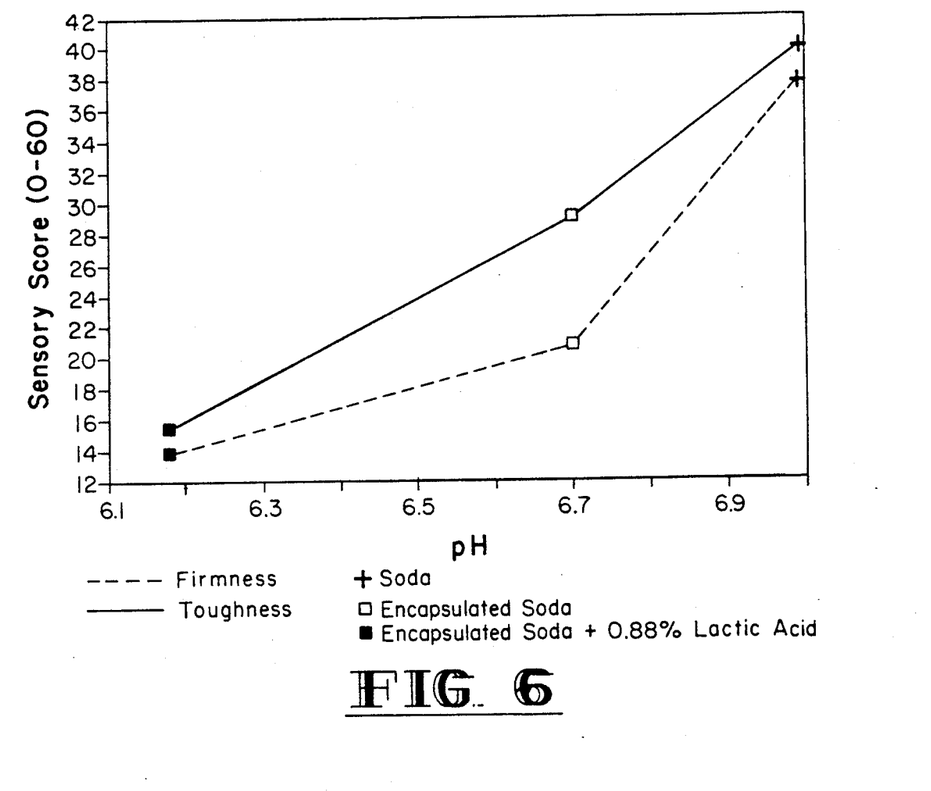
FIG. 6 shows the effect of low pH and ionic strength on product quality.

The second approach for minimizing ionic attraction is to lower the product pH and ionic strength. The high net positive charge on the protein at low pH also results in electrostatic repulsion, particularly at low ionic strength. As shown in FIG. 6, an unexpected finding is that by encapsulating soda, the pH and/or ionic strength effect which significantly reduces microwave-induced toughening is magnified. The pH can be lowered using any food grade acid. A preferred group of acids are alpha, beta-unsaturated carboxylic acids. Fruits high in these kinds of acids or even cinnamon which contains alpha, beta-unsaturated aldehydes and acids may be included, too.

The foregoing methods may be utilized to reduce microwave-induced toughness in precooked dough-based products that are reheated in the microwave oven, in products which are cooked from the dough form in a microwave oven, and in products reconstituted from dry mixes and then cooked in a microwave oven.

The rate of firming upon cooling is accelerated by microwave reheating or cooking. The reasons for the accentuation of both toughening and firming is not completely understood. While toughening has been found to be predominantly a protein-related phenomenon, firming has been found to be predominantly a starch-related phenomenon. The solutions for microwave-induced firming can be used for both dough-based and batter-based bread-like products.

Conventionally baked doughs have a continuous protein structure or matrix formed by gluten in wheat flour. Scanning electron microscope data and enzyme digestion studies show that protein is also the continuous phase in microwave heated products. However, the starch granules of microwave heated doughs appear to be swollen to a much greater extent than those in conventionally heated products. It is possible that the starch-starch interactions can occur at a much more rapid rate if the granule is fully swollen. This would result in a product that firms at a much more rapid rate.

Starch-starch interaction can be minimized by a broad class of inhibitors such as surfactants, hydrogen bond breaking agents, and high molecular weight polymers such as gums. Since starch granules are embedded in a gluten film all the gluten interaction inhibitors described above for minimizing toughening development may also minimize firming because the degree of swelling and ensuing starch interaction is modified by the presence of the gluten film. Examples include low ionic strength and/or pH, chemical reducing agents, surfactants, etc.

Firmness can also be reduced by decreasing the product cooling rate after reheating or cooking in the microwave oven. This can be done by cooling the product in an enclosed plastic pouch after heating or cooking as disclosed by Anderson et al., cited above.

Theoretical calculations based on open structure foams show that decreasing the wall thickness reduces the firmness exponentially (Ashby, 1983). Thus, minor changes in gas cell wall thickness may have a significant effect on product attributes. Gas cell wall thickness is inversely proportional to the number of air cells per unit volume.

The desired product structure can be obtained by processing steps such as chemical or yeast leavening of dough combined with intermittent punching which leads to subdivision of air cells.

Figure 9:
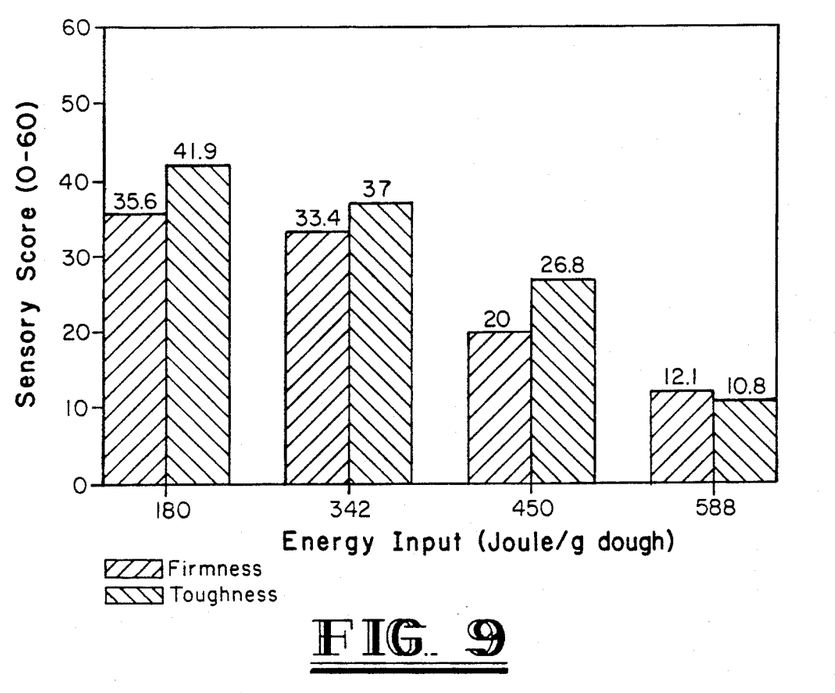
FIG. 9 shows the effect of overmixing on product quality.

Another method or treatment for reducing toughness and firmness in product is by overdevelopment of the dough beyond peak as measured by wattmeter. Overdevelopment is more than 20% preferably more than 30% and most preferably more than 40% of optimal development on a work input basis. It has been found that such overdevelopment will result in a decrease in toughness and firmness. The more the degree of overdevelopment generally the greater reduction in toughness and firmness. It should be understood that extreme overdevelopment should be avoided because of the loss in specific volume of the cooked product. Overdevelopment is normally to be avoided in conventionally cooked product because of loss of cooked specific volume, however, microwave cooking tends to compensate for this loss probably because of steam generation. A discussion of optimal or peak development can be found in Hoseney (1986) Chapter 10. FIG. 9 shows the surprising effect of overdevelopment on product quality.

The foregoing solutions for toughness and firmness are effected either by the addition of ingredients and/or in the methods approaches in amounts sufficient to improve the quality level as set forth above.

The present invention is particularly applicable to those bread like products which, when cooked either by conventional means or microwave radiation, may contain ingredients as described above and other additional ingredients can be contained in the product as are known in the art. The products herein described in their uncooked state i.e., the batter or dough state may contain ingredients as described above and additional ingredients as are known in the art.

Refrigerated doughs are known in the industry. They are raw or fresh dough stored in a sealed container. When pressurized, the gauge pressure is in the range of between about one-half and about 2 atmospheres, preferably about 1 atmosphere. Refrigerated storage temperatures are less than about 5° C. and preferably in the range of between about 0° C. and about 5° C. Storage time is typically 6-12 weeks.

Frozen doughs are stored at a temperature of less than 0° C. and preferably less than about −10° C.

The invention further extends to a refrigerated or frozen dough product suitable for heating or cooking by microwave irradiation, and to an edible product heated or cooked by microwave irradiation, which products have been produced using any of the methods of this invention.

The following examples are intended to illustrate the present invention, and are not to be construed as limiting the invention in any way.

EXAMPLE I

This example shows the effect upon microwave-induced firmness and toughness of various additives in chemically leavened fresh dough products. Chemically leavened biscuits were cooked in a microwave oven from raw dough. The doughs had the following formulas:

TABLE 2

| Ingredient | Dough Composition Percent by Weight | | | |
|---|---|---|---|---|
| | A | B | C | D |
| Hard Wheat Flour | 57.63 | 57.624 | 59.34 | 54.44 |
| Water | 32.52 | 32.52 | 32.52 | 30.71 |
| Dextrose | 4.04 | 4.04 | 4.04 | 4.04 |
| Shortening | 2.53 | 2.53 | 2.53 | 2.53 |
| SAPP | 1.51 | 1.51 | 0 | 1.51 |
| Soda | 1.11 | 1.11 | 0 | 1.11 |
| Salt | 0.66 | 0.66 | 0 | 0.66 |
| Cysteine | 0 | 0.006 | 0 | 0 |
| Encapsulated Soda | 0 | 0 | 1.57 | 0 |
| Urea | 0 | 0 | 0 | 5 |
| Total | 100.00 | 100.00 | 100.00 | 100.00 |

The biscuits were made according to the following procedure:

1. Mixing—Weigh all ingredients. Preblend all dry ingredients in Hobart bowl with a Model N-50 mixer at low speed (#1) for 1½ min. with dough hook. Add molten shortening while preblending. Add water and mix for additional 2.5 min. Change the speed to high #2 and continue mixing for a additional 10 min.
2. Sheeting—Roll dough on lightly floured board. Cut with an elliptical cutter (6.35 cm×8.26 cm). The resulting dough piece is 0.635 cm thick and weighs 22 g.
3. Proofing—Store 30 minutes at 32° C./70% relative humidity on a cookie sheet covered with plastic wrap.
4. Storage—The proofed product can be covered and stored frozen or refrigerated until use for microwave baking. For precooked product preparation, the proofed product can be cooked (e.g. 232° C. for 7 minutes) in the oven prior to storage.
5. Cooking and evaluation—A 5.5° C. dough pad was placed on a cardboard pedestal, raised 5 cm off the floor of a Litton Generation II microwave oven and baked for 25 seconds on high. The biscuits were cooled for 10-15 minutes, served to the panel, and evaluated. The results of this evaluation are shown in Table 3. All products from samples B, C and D were judged to have a less tough and less firm texture than the control from sample A.

TABLE 3

| Sample | Biscuit Evaluation Sensory Score | |
|---|---|---|
| | Firmness | Toughness |
| A | 38 | 40 |
| B | 27 | 30 |
| C | 11 | 22 |

These evaluations show that encapsulation of soda and the reduction in ionic strength by removing SAPP and salt (sample C) as well as inclusion of cysteine (sample B) reduce texture problems.

Since urea, a hydrogen bond-breaker, is not an approved food ingredient, instrumental measurement using the Kramer shear press was used instead of organoleptic testing. Several concentrations of urea in the dough were prepared (using corresponding alterations in the amount of flour) and tested, results being shown in FIG. 7. Based on these results sample D is an improvement of more than 30% over sample A.

EXAMPLE II

This example shows the effect upon microwave-induced firmness and toughness of various additives in chemically leavened fresh dough product produced under higher shear condition. Chemically leavened biscuits were cooked in the microwave oven from raw dough. The biscuit doughs had the compositions shown in Table 4.

TABLE 4

| Ingredients | Biscuit Dough Compositions Percent by Weight | | |
|---|---|---|---|
| | E | F | G |
| Hard Wheat Flour | 57.63 | 57.60 | 57.6175 |
| Water | 32.52 | 32.52 | 32.52 |
| Dextrose | 4.04 | 4.04 | 4.04 |
| Shortening | 2.53 | 2.53 | 2.53 |
| SAPP | 1.51 | 1.51 | 1.51 |
| Soda | 1.11 | 1.11 | 1.11 |
| Salt | 0.66 | 0.66 | 0.66 |
| $KIO_3$ | 0 | 0.03 | 0 |
| K-Sorbate | 0 | 0 | 0.0125 |
| Total | 100.00 | 100.00 | 100.00 |

The biscuits were made according to the following procedure:
1. Mixing—Same as in Example I except that a much smaller batch size and a more efficient mixing paddle were used so that the energy input per unit weight of dough is much higher.
2. Sheeting, proofing, storage, and cooking—Same as in Example I.

All products from samples F and G were judged to have less toughness and firmness than the control from sample E which was also softer and less tough than sample A in Example I.

TABLE 5

| Sample | Sensory Score | |
|---|---|---|
| | Firmness | Toughness |
| E | 30 | 35 |
| F | 25 | 31 |
| G | 22 | 27 |

EXAMPLE III

This example shows the effect of pouching in chemically leavened fresh dough product. Biscuit sample H having the same formula as biscuit sample A in Example I, was microwave-cooked and cooled on a susceptor in a plastic pouch, while sample A was cooked and cooled on a susceptor without the pouch. The cooked products were cooled to different center temperatures and evaluated in the same manner as those in Example I. The pouched product (H) has a lower cooling rate than the unpouched product. The pouched variable at both 48.9° C. and 60.0° C. was judged more tender with a softer texture than the control (unpouched) at both those temperatures. There was no difference between the pouched and control variables at both 32.2° C. and 87.8° C. The results are tabulated as follows:

TABLE 6

| Sample | Temperature (°C.) | Sensory Score Center Product | |
|---|---|---|---|
| | | Toughness | Firmness |
| Pouched | 32.2 | 48 | 48 |
| Unpouched | 32.2 | 49 | 49 |
| Pouched | 48.9 | 27 | 23 |
| Unpouched | 48.9 | 37 | 35 |
| Pouched | 60.0 | 32 | 20 |
| Unpouched | 60.0 | 40 | 28 |
| Pouched | 87.8 | 18 | 12 |
| Unpouched | 87.8 | 19 | 10 |

This example shows the effect of a surfactant on precooked yeast-leavened product. Yeast-leavened breads (Samples I and J) were prepared according to the formula shown in Table 7.

TABLE 7

| Ingredients | Bread Dough Formula Percent by Weight | |
|---|---|---|
| | I | J |
| Hard Wheat Flour | 56.03 | 55.40 |
| Water | 34.73 | 34.35 |
| Sucrose | 3.36 | 3.32 |
| Non-Fat Milk Solids | 2.24 | 2.22 |
| Shortening | 1.68 | 1.66 |
| Yeast | 1.12 | 1.11 |
| Salt | 0.84 | 0.83 |
| SSL | 0.00 | 1.11 |
| Total | 100.00 | 100.00 |

Doughs were prepared according to the straight dough process described by Finney (1984) except a 1500 g batch was prepared using a model N-50 Hobart mixer equipped with a dough hook. From that dough, 300 g loaves were baked in a conventional oven for 24 minutes at 218° C. After cooling, the loaf was cut into 1.25 cm, 18 g slices. The slices were microwaves on high for 25 seconds. The microwaved slices were evaluated using the Kramer Shear Press as described above. Sample J gave consistently lower firmness and toughness values than sample I.

TABLE 8

| Sample | Sensory Score | | Kramer shear press |
|---|---|---|---|
| | Firmness | Toughness | Firmness (kPa) |
| Sample I | 29 | 42 | 764 |
| Sample J | 25 | 24 | 642 |

EXAMPLE V

This example shows the effect of protease on firmness and toughness of frozen dough product. Chemically leavened biscuits were cooked in the microwave oven from frozen raw dough. The biscuits had the following formulas:

TABLE 9

| Ingredients | Percent by Weight | |
| --- | --- | --- |
| | K | L |
| Hard Wheat Flour | 57.63 | 57.63 |
| Water | 32.52 | 32.27 |
| Dextrose | 4.04 | 4.04 |
| Shortening | 2.53 | 2.53 |
| SAPP | 1.51 | 1.51 |
| Soda | 1.11 | 1.11 |
| Salt | 0.66 | 0.66 |
| B. Subtilis protease (0.5 AU/g) | 0 | 0.25 |
| TOTAL | 100.00 | 100.00 |

The biscuits were made according to the following procedure:
1. Mixing—Preblend all dry ingredients in Hobart bowl with a Model N-50 mixer at low speed (#1) for 1½ min with dough hook. Add molten shortening while preblending. Add water and mix for an additional 2 minutes.
2. Sheeting and proofing—Same as example I. The dough diameter and height ratio was decreased for the samples with protease so that the finished product after microwave heating had the same diameter/height ratio.
3. Storage—The proofed product was stored frozen prior to cooking. The products were microwaved on high for 25 to 35 seconds. Products from sample L were judged to have a less tough and less firm texture than the sample K. The panel determined sensory scores are shown in Table 10.

TABLE 10

| Sample | Sensory Score | |
| --- | --- | --- |
| | Firmness | Toughness |
| K | 39 | 43 |
| L | 18 | 20 |

Preferred, more preferred and most preferred approximate effective levels of agents of the present invention in doughs are presented in Table 11.

TABLE 11

| | Preferred | More Preferred | Most Preferred |
| --- | --- | --- | --- |
| disulfide reductant (micromole/g dough) | 0.1–1 | 0.3–0.8 | 0.4–0.7 |
| alpha, beta unsat'd (micromole/g dough) | >0.4 | >0.5 | 0.6–1 |
| protease (milli-AU/g dough) | 0.2–8 | 0.5–5 | 0.8–4 |
| surfactant | 0.3%–1.5% | 0.6%–1.2% | 0.8%–1% |
| fast acting oxidants (microequivalent/g dough) | 0.1–0.6 | 0.3–0.5 | 0.3–0.4 |

REFERENCES CITED

The entirety of each of the following references, plus the references cited therein, are incorporated by reference herein.

| U.S. Patent Documents | | |
| --- | --- | --- |
| U.S. Pat. Nos. | Date | Inventor |
| 4,463,020 | 07-31-84 | Ottenberg, R. |
| 4,560,559 | 12-24-85 | Ottenberg, R. |

OTHER PUBLICATIONS

Anonymous, (1987) "Lot Of Work And Research Went Into Zappetites Debut". World Food & Drink Report, Oct. 8.

Ashby, M. F., (1983) "The Mechanical Properties of Cellular Solids". Metallurgical Transaction A, 14A(9):1755.

Finney, K. F., (1984) "An Optimized Straight-Dough Bread-Making Method After 44 Years". Cereal Chemistry, 61:20.

Hoseney, R. Carl, (1986) "Principles of Cereal Science and Technology". American Association of Cereal Chemists Inc. St. Paul, Minn.

Instron, (1987) "Series IX, Materials and Testing System". Manual M12-2-152, Instron Corporation, Canton, Mass.

Kimbrell, W. (1987) "Microwave ovens provide new opportunities for bakery companies". Bakery Production and Marketing, 22(11):19.

Kramer, A., Burkhardt, G. J. and Rogers, H. P. (1951) "The Shear-Press: A Device for Measuring Food Quality". The Canner, 112 (5):34–40.

Moore, K. (1979) "Microwave Pizza Bows in Test Market; New Protein System Makes Crispy Crust". Food Product Development, 13 (10):20.

Moskowitz, H. R. (1983) "Product Testing and Evaluation of Foods". Food & Nutrition Press, Westport, Conn.

Rosenberg, U. and Bogl, W. (1987) "Microwave Thawing, Drying, And Baking In The Food Industry". Food Technology, 41(6):85.

Schofield, J. D., Bottomley, R. C., Timms, M. F., and Booth, M. R. (1983). "The effect of heat on wheat gluten and the involvement of sulphydryl-disulphide interchange reactions". J. Cereal Sci., 1:241.

Changes may be made in the construction, operation and arrangement of the various parts, elements, steps and procedures described herein without departing from the concept and scope of the invention as defined in the following claims.

What is claimed is:

1. A method for producing an edible starch-based bread-type product having a desired degree of toughness, the method comprising the steps of:
    forming a dough comprising water, flour and a texturizing agent selected from the group consisting of surfactants, hydrogen bond-breakers, fast acting oxidants, enzymes, and disulfide-reactants, the texturizing agent being included in an amount sufficient to provide a degree of toughening of the edible product when subjected to microwave irradiation which is distinguishably less than the degree of toughening generated from a dough which is formed without the texturizing agent;
    preparing a product intermediate from said dough, and
    exposing said product intermediate to microwave irradiation for a time sufficient to produce a desired edible product, said edible product having at least about 15 weight percent total water.

2. The method of claim 1, wherein the agent interferes with hydrogen-bond formation.

3. The method of claim 1, wherein the agent is a fast acting oxidant.

4. The method of claim 1, wherein the agent is a fast acting oxidant having an reduction potential greater than that of quinone.

5. The method of claim 1, wherein the agent is an enzyme.

6. The method of claim 5, wherein the enzyme is a protease or deamidase.

7. The method according to claim 1, in the agent is a surfactant.

8. The method of claim 7, where the surfactant is stearyl lactylates, ethoxylated monoglycerides, a diacetyl ester of mono or diglycerides, a sorbitan mono-fatty acid esters, monoglyceride, 1-propylene glycol mono-fatty acid esters, sucrose mono-fatty acid esters, diacetyl tartaric acid ester of monoglycerides, polysorbate 60 or polysorbate 80.

9. The method of claim 8 where the monoglycerides are mono-stearates.

10. The method of claim 8 where the level of surfactant is about 1% by weight of the dough.

11. The method of claim 4, where the oxidant is potassium iodate, calcium iodate, potassium bromate, calcium bromate or azodicarbonamide.

12. The method of claim 4 where the oxidant is potassium iodate, calcium iodate, or azodicarbonamide.

13. The method of claim 4 where the oxidant is potassium iodate.

14. The method of claim 12 where the level of oxidant is about 0.4 micro equivalents per gram of dough.

15. The method of claim 2, where the agent is urea, dimethylsulfoxide, dimethylformamide or guanidine hydrochloride.

16. The method of claim 15 where the agent is 1–5 weight percent of dough.

17. The method of claim 5, where the enzyme is from at least about 0.2 to 8 milli-AU per gram of dough.

18. The method of claim 5, where the enzyme is about 4 milli-Au per gram of dough.

19. The method of claim 1, wherein the disulfide-reactant is a disulfide reductant.

20. The method of claim 1 wherein the agent is a yeast extract or autolysate comprising protease and glutathione.

21. The method of claim 19, wherein the disulfide reductant is a thiol containing compound.

22. The method of claim 21, where the thiol-containing compound is cysteine, mercaptoethanol, glutathione or dithiothreitol.

23. The method of claim 21 where the thiol-containing compound is from about 0.1 to about 1 micromoles per gram of dough.

24. The method of claim 21, wherein the thiol-containing compound is about 0.5 micromoles per gram of dough.

25. The method of claim 1, wherein the step of preparing the product intermediate includes precooking the dough.

26. The method of claim 25, wherein the precooking is effected by conventional cooking.

27. The method of claim 25, wherein the precooking is effected by exposure to microwave irradiation.

28. A method according to claim 1, wherein the product intermediate is exposed to microwave irradiation to cook the product intermediate and produce a desired edible product.

29. A method according to claim 1, wherein the product intermediate is a cooked product and is exposed to microwave irradiation to reheat for consumption.

30. A method for producing a dough-based product having a desired degree of toughness, the method comprising the steps of:
forming a dough comprising water, flour and a texturizing agent selected from the group consisting of surfactants, hydrogen bond-breakers, fast acting oxidants, enzymes, and disulfide-reductants, the texturizing agent being included in an amount sufficient to provide a degree of toughening of the edible product when subjected to microwave irradiation which is distinguishably less than the degree of toughening generated from a dough which is formed without the texturizing agent;
preparing an uncooked product intermediate from said dough;
storing said product intermediate in a sealed container at a temperature of less than about 5° C.;
removing said product intermediate from said container; and
exposing said product intermediate to microwave irradiation for a time sufficient to cook said product intermediate to form a desired cooked edible product, said cooked edible product having at least about 15 weight percent total water.

31. A method as set forth in claim 30 wherein said product intermediate is stored in said container and is under a gauge pressure of least about one-half atmosphere.

32. A method as set forth in claim 30 wherein said products intermediate is stored at a temperature in the range of between about 0° C. and about 5° C.

33. A method as set forth in claim 30 wherein said product intermediate is stored at a temperature of less than about 0° C.

34. A method for producing a dough-based product having a desired degree of firmness, the method comprising the steps of:
forming a dough comprising water, flour and a texturizing agent selected from the group consisting of surfactants, hydrogen bond-breakers, fast acting oxidants, enzymes and disulfide reactants, the texturizing agent being included in an amount sufficient to provide a degree of toughening of the edible product when subjected to microwave irradiation which is distinguishably less than the degree of firming generated in an equivalent product which is formed from a dough without the texturizing agent;
preparing an uncooked product intermediate from said dough;
storing said product intermediate in a sealed container at a temperature of less than about 5° C.;
removing said product intermediate from said container; and
exposing said product intermediate to microwave irradiation for a time sufficient to cook said product intermediate to form a desired cooked edible product, said cooked edible product having at least 15 weight percent total water.

* * * * *

UNITED STATES PATENT AND TRADEMARK OFFICE
CERTIFICATE OF CORRECTION

PATENT NO.  :   5,035,904
DATED       :   July 30, 1991
INVENTOR(S) :   Victor T. Huang *et al.*

It is certified that error appears in the above-identified patent and that said Letters Patent is hereby corrected as shown below:

```
In claim 7, column 17, line 5, delete the term "in" and insert
     the term --wherein-- therefor.
```

Signed and Sealed this

Twenty-fourth Day of November, 1992

*Attest:*

DOUGLAS B. COMER

*Attesting Officer*    *Acting Commissioner of Patents and Trademarks*